United States Patent Office 2,808,153
Patented Oct. 1, 1957

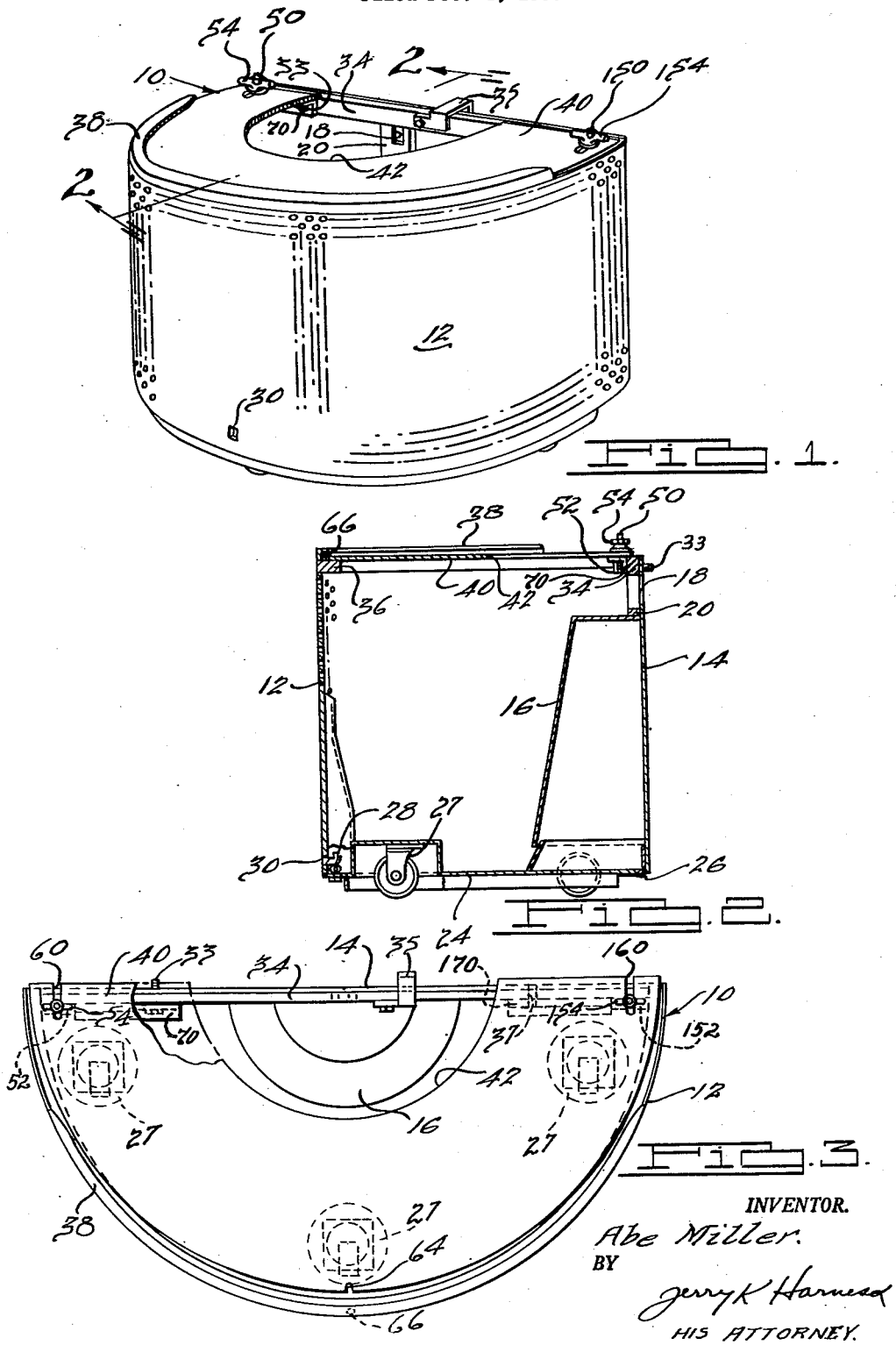

2,808,153
EXTRACTOR BASKET AND COVER THEREFOR

Abe Miller, Detroit, Mich., assignor to Miller Laundry Machinery Company, Detroit, Mich., a corporation of Michigan Application December 4, 1953, Serial No. 396,198

5 Claims. (Cl. 210—237)

My invention relates generally to commercial laundry equipment and more particularly to an improved extractor basket and cover therefor utilized for receiving laundered material from a commercial type washing machine. The present invention is an improvement of the structure shown in copending application of Herman Miller, Serial No. 361,890, filed June 16, 1953, now abandoned.

By conventional practice, clothing and the like are dumped or manually removed from a commercial washing machine and placed in an extractor basket. A pair of these baskets which are semi-cylindrical in configuration are then placed in an extracting machine to effect removal of water from the clothing. The baskets must be properly packed and balanced to insure correct operation of the equipment.

It has also been found necessary to remove the covers of the baskets after they have been joined with their companion baskets to accomplish, among other things, the aforementioned balanced condition.

A principal object of my invention is to provide an improved extractor basket assembly which has an improved cover device that may be speedily and easily removed at all times.

A further object of my invention is to provide an improved extractor basket which is easily as well as speedily loaded compared to others known in the art.

Another object of my invention is to provide an improved extractor basket which is readily balanced when loaded.

Still a further object of my invention is to provide an improved extractor basket which is easily as well as economically manufactured.

More particularly, my invention comprises an improved extractor basket which is characterized by a fully open upper end having a convenient and novel closure therefor.

By utilizing my improved device, the extractor basket assemblies may have their covers conveniently removed even while suspending during the balancing of the companion baskets.

Other objects and advantages will become more apparent from the following description of one embodiment of my invention, reference being had to the accompanying drawings in which:

Fig. 1 is a perspective view of my improved extractor basket.

Fig. 2 is a sectional view taken on the line 2—2 of Fig. 1.

Fig. 3 is a plan view of my improved device wherein the cover is in a partially applied position.

Referring now to the drawings, I have shown my improved extractor basket, generally designated by the numeral 10, which comprises a semi-cylindrical perforated side wall 12 which is connected at its lateral side portions by a generally planular wall 14. These walls are, for example, welded together at their juncture. The planular wall 14 is provided with a semi-frustoconical depression 16 which is provided in the wall 14 for the purpose of adapting the extractor basket to conventional types of extracting machines. In conventional types of extractor machines, a bearing unit projects upwardly from the bottom of the machine and the depression 16 is provided in the wall 14 so that the basket 10 will fit over the bearing unit. The wall 14 is also provided with an opening 18 which is reinforced by a reinforcing member 20 for accommodating the reception of a hook. The hook, which is not shown for the purpose of simplicity, is part of a hoisting device which is used to lift my improved basket with its companion basket from a position where it has been packed with laundry, upwardly and into an extracting machine.

My improved basket 10 is provided with a bottom door 24 which is pivotally connected to the wall 14 by hinges such as 26 on the lower edge of the wall 14. The semi-circular edge of the door is provided with a pivotally mounted spring pressed latch member 28 which is received within an opening 30 disposed in the side wall 12. This construction is utilized to hold the bottom door 24 in place until the basket is removed from the extracting machine. After this removal is accomplished, the latch member 28 may be removed to allow the door 24 to swing downwardly to remove the laundered material. The door 24 is provided with conventional castor units 27 which allow the extractor basket to be rolled about as desired. While I have shown a simple construction for holding the bottom door in a closed position it will be understood that this showing is merely for illustrative purposes and that various types of closure means may be employed without departing from the scope of the invention.

The upper lateral edge of the planular wall 14 is provided with a member 34 which extends along the wall on the inside of the basket and is preferably welded thereto. The member 34 not only reinforces the upper edge of the wall 14 but also forms a seat for one edge of a cover in a manner hereinafter set forth.

By conventional practice, two extractor baskets are placed side by side so that they form a complete cylinder and thereafter a hoist operated hook is placed through the adjoining openings in the planular walls and the two baskets are lifted together. To insure the correct alignment of the baskets, each is provided with a stud 33, a pivotally mounted clamp 35, and an opening 37. The stud 33 is preferably welded to the member 34 and extends into an opening such as 37 in the companion basket while the clamp 35 clampingly holds the companion baskets together.

Similarly, the upper inside edge of the semi-cylindrical wall 12 is provided with a semi-circular member 36 which is also preferably welded thereto. The member 36 serves not only to reinforce the upper edge of the semi-cylindrical wall 12 but also to seat and retain the aforementioned cover.

A cover member 40 formed from a semi-circular piece of flat metal is adapted to be disposed over the open upper end of the basket. The cover member 40 has substantially the same diameter as the wall 12 so that its edge does not overhang any portion of the top of the basket. The cover 40 is provided with a semi-circular cutout 42 so that the hook may pass through this opening to engage the wall 14 in the opening 18.

The straight edge of the cover 40 is supported by the member 34 while the semi-circular edge is supported by the member 36. The upper edge of the semi-cylindrical wall 12 is provided with an angle member 38 which forms a channel for receiving a portion of the curved edge of the cover 40 as more clearly seen in Figs. 1 and 2. A pin 66 is preferably welded in the channel formed by the member 36 and the angle member 38 at a point substantially equidistant from the opposed corners of the junction of the walls 12 and 14. The cover member 40 is provided with a notch 64 which mates with the pin 66 to thereby index the cover member 40 relative to the basket and prevent relative shifting movement between the cover member 40 and the basket.

Although it has been found that my improved device will operate satisfactorily with only the cover member 40 having a portion of its edge indexed within the channel formed primarily by the angle member 38, a safety measure has been added. In this respect the open end of the basket 10 is provided with threaded studs 50 and 150 which are retained in metal blocks 52 and 152, respectively, the latter being preferably welded to the basket at the juncture of the supporting members 34 and 36. The studs 50 and 150 extend upwardly and through open ended slots 60 and 160 in the cover member 40, respectively. Wing nuts 54 and 154 are threaded onto the studs 50 and 150 and engage the cover member to thereby hold it in position, respectively.

The slots 60 and 160 are longer than would normally be necessary for the purpose of facilitating speedy application and removal of the cover member 40. For example, to accomplish removal of the cover member, the nuts 54 and 154 are loosened and the cover member is manually moved so that the studs are moved further in towards the closed ends of the slots. This position is shown in Fig. 3. In this position, it will be seen that the curved edge of the cover member 40 has moved out of the channel. At this point the curved section may be lifted upwardly and then the studs are removed from the slots by merely lifting away the cover member 40. The reverse procedure is used to apply the cover member. It will be seen when viewing Fig. 2 that the straight lateral edge of the cover member 40 is spaced from the upper edge of the planular wall 14. This improved construction has been found necessary to accommodate removal of the cover member 40 from the basket when a pair of baskets are placed side by side to form a cylinder. It will be seen when viewing Fig. 3 that the straight edge of the cover member 40 extends over the wall 14 during application and removal of the cover member. To further support the cover member 40, the member 34 is provided with angle members 70 and 170 which are preferably welded thereto.

It will also be seen that the indexing means, namely the pin 66 and the slot 64 serve to hold the cover member 40 from shifting along its curved edge so that its straight edge is maintained parallel to the wall 14. By this construction the space between the straight edges of the cover members disposed on the companion baskets remains uniform to thereby allow removal of either cover member while the baskets are together.

It will be seen that my improved extractor basket is a complete unit in and of itself. My improved basket may be utilized with any conventional extracting machine which uses a rotating drum. By using my improved basket, laundered material may be conveniently loaded, packed and balanced due to its substantially open end. The cover member may also be conveniently removed at any time because of my improved construction.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In laundry handling equipment, the combination of an extractor basket comprising a substantially semi-cylindrical side wall connected at its lateral extremities by a substantially planar wall, means forming a closure for the bottom of the basket, the top of said basket being substantially fully open and including an inwardly directed substantially radially extending flange portion secured to the curved extremity of said semi-cylindrical side wall, said basket including retaining means secured to said basket adjacent said open end, and a substantially semi-circular flat cover member disposed over said open end having a curved edge and a straight edge, said cover member having a portion of its curved edge matingly disposed within said flange portion to prevent outwardly directed radial movement of the cover with respect to the basket, said cover member having an open slot extending inwardly of said cover member from said straight edge and receiving portions of said retaining means, said slot having a predetermined length to permit inwardly directed radial movement of the cover for removal of said curved edge from said flange portion without removing said portion of the retaining means from within said slot, said straight edge of said cover member being substantially parallel to and normally spaced outwardly from the outer surface of said planar wall when the curved edge of the cover is matingly disposed within said flange of said basket to accommodate radial adjustment and speedy removal of said cover member.

2. In a laundry handling extractor basket of the type used in side by side pairs in an extractor, with each basket comprising a semi-cylindrical vertical side wall connected at its lateral edges by a substantially vertical planar wall having a straight upper edge, said basket having a bottom closure and a bottom-and-side-wall-opening-socket for cooperation with a mating socket of the mating basket for receiving a vertical basket bearing and spinning means of the extractor, with such basket having a lift enabling means on its upper straight edge, and also having a semi-circular top cover having a cut-out at its straight edge giving access to the lift enabling means, and with the basket having means at its curved edge upon which the cover may rest or be supported, the improvement which comprises an inwardly directed substantially radially extending horizontal flange secured to the curved upper edge of said semi-cylindrical side wall and spaced above the cover supporting means of the basket, a curved vertical flange connecting the outer edge of such horizontal flange to the basket, with said flanges and said cover curved outer edge being so dimensioned that the cover edge can fit inside the channel formed by said flanges, whereby outward or upward movement or both of said cover, due to centrifugal forces, is inhibited by said flanges, an upwardly projecting pin on said basket straight upper edge spaced from said cut-out, said cover having an open slot extending inwardly of the straight edge of the cover and receiving said pin, the slot having its length predetermined to permit inwardly directed radial movement of the cover for removal of said curved outer edge from said channel within the flanges without removing the pin from said slot, said cover straight edge being parallel to but normally spaced outwardly from the outer surface of the planar wall of the basket, when the curved outer edge of the cover is within said channel, a sufficient distance to enable the cover to be moved inwardly of the basket, though not beyond the outer surface of the planar side of the basket, and clear the upper flange, thus providing and accommodating radial adjustment and permitting speedy removal of the cover, even while two baskets are side by side in an extractor.

3. A construction as described in claim 2 wherein the two flanges are integral, being formed of an L-shaped member.

4. A construction as described in claim 2 wherein the lift enabling means of the basket straight edge, and the cover cut-out are at the center of the straight edge, and wherein there are two pins and slots, spaced on opposite sides of said cut-out.

5. A construction as described in claim 2 wherein the pin is fixed to the basket straight edge and has a screw thread and nut at its upper end.

References Cited in the file of this patent

UNITED STATES PATENTS

| | | |
|---|---|---|
| 946,646 | Pratt | Jan. 18, 1910 |
| 1,255,392 | Crowe | Feb. 5, 1918 |
| 1,658,853 | Murray | Feb. 14, 1928 |
| 2,534,286 | Maitzen | Dec. 19, 1950 |
| 2,614,724 | Wyman | Oct. 21, 1952 |